(12) United States Patent
Yuen et al.

(10) Patent No.: US 10,639,870 B2
(45) Date of Patent: May 5, 2020

(54) POLYMER FIBER COMPOSITE

(71) Applicant: HEWLETT-PACKARD DEVELOPMENT COMPANY, L.P., Houston, TX (US)

(72) Inventors: Hang Yan Yuen, Fort Collins, CO (US); Hui He, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 190 days.

(21) Appl. No.: 15/516,484

(22) PCT Filed: Nov. 17, 2014

(86) PCT No.: PCT/US2014/065888
§ 371 (c)(1),
(2) Date: Apr. 3, 2017

(87) PCT Pub. No.: WO2016/080944
PCT Pub. Date: May 26, 2016

(65) Prior Publication Data
US 2017/0313041 A1    Nov. 2, 2017

(51) Int. Cl.
*B32B 27/12* (2006.01)
*B32B 5/16* (2006.01)
(Continued)

(52) U.S. Cl.
CPC .............. *B32B 27/12* (2013.01); *B32B 5/02* (2013.01); *B32B 5/024* (2013.01); *B32B 5/16* (2013.01); *B32B 5/22* (2013.01); *B32B 5/28* (2013.01); *B32B 5/30* (2013.01); *B32B 27/304* (2013.01); *B32B 27/322* (2013.01); *B32B 27/34* (2013.01); *B32B 27/36* (2013.01); *B32B 2260/021* (2013.01); *B32B 2260/046* (2013.01);
(Continued)

(58) Field of Classification Search
CPC ................................................. B32B 2307/724
See application file for complete search history.

(56) References Cited

U.S. PATENT DOCUMENTS 7,226,969 B2    6/2007    Ristic-Lehmann et al.
8,536,248 B2    9/2013    Nakamoto et al.
(Continued)

FOREIGN PATENT DOCUMENTS

JP      2009-149369 A      7/2009
WO      WO-2011107273      9/2011
WO      WO-2014070792      5/2014

OTHER PUBLICATIONS

Nitto Double Sided Tape No. 500 product information, as retrieved from https://www.nitto.com/us/en/products/group/double/004/.*
(Continued)

*Primary Examiner* — Ian A Rummel
(74) *Attorney, Agent, or Firm* — HPI Patent Department

(57) ABSTRACT

Provided in one example is a composite. The composite includes: a porous core layer including a fluoropolymer; a first layer disposed over at least a portion of the core layer; and a second layer disposed over at least a portion of the first layer. The first layer includes fibers that compose at least one of unidirectional fibers and woven fibers. The second layer includes a polymer. The composite is permeable to air but impermeable to liquid wafer.

15 Claims, 3 Drawing Sheets

(51) Int. Cl.

| | | |
|---|---|---|
| *B32B 5/28* | (2006.01) | |
| *B32B 27/34* | (2006.01) | |
| *B32B 5/02* | (2006.01) | |
| *B32B 27/30* | (2006.01) | |
| *B32B 27/32* | (2006.01) | |
| *B32B 27/36* | (2006.01) | |
| *B32B 5/22* | (2006.01) | |
| *B32B 5/30* | (2006.01) | |

(52) U.S. Cl.
CPC . *B32B 2262/0269* (2013.01); *B32B 2262/101* (2013.01); *B32B 2262/103* (2013.01); *B32B 2262/106* (2013.01); *B32B 2264/0257* (2013.01); *B32B 2307/50* (2013.01); *B32B 2307/51* (2013.01); *B32B 2307/546* (2013.01); *B32B 2307/706* (2013.01); *B32B 2307/72* (2013.01); *B32B 2307/724* (2013.01); *B32B 2307/7265* (2013.01); *B32B 2457/00* (2013.01)

(56) References Cited

U.S. PATENT DOCUMENTS

| | | | |
|---|---|---|---|
| 2006/0255493 A1* | 11/2006 | Fouladpour | B29C 51/10 |
| | | | 264/161 |
| 2010/0206660 A1 | 8/2010 | Horie et al. | |
| 2011/0188247 A1 | 8/2011 | Huang et al. | |
| 2012/0261289 A1* | 10/2012 | Wyner | A45C 11/00 |
| | | | 206/320 |
| 2013/0199607 A1 | 8/2013 | Garreau-Iles | |
| 2014/0160680 A1 | 6/2014 | Stevens | |
| 2014/0228081 A1 | 8/2014 | Chang | |
| 2014/0283691 A1* | 9/2014 | Furuuchi | B01D 71/36 |
| | | | 96/12 |

OTHER PUBLICATIONS

Victor Lusvardi and Chuck Seipel, "Keeping Smart Phones Protected," applianceDesign, Nov. 2012, pp. 22-24.

* cited by examiner

POLYMER FIBER COMPOSITE

BACKGROUND

The housing/casing of electronic devices is frequently subject to mechanical deformation due at least in part to its frequent contact with other objects (e.g., table, hand, ground, etc.). Thus, these devices, particularly the housing thereof, often need to have materials having sufficient mechanical strength to withstand the deformation. At the same time, with higher power output in an electronic devices, thermal management may be important. Thermal management may involve keeping the interior of the device at a temperature that is sufficiently low to avoid thermal degradation of the materials of the components of the device.

BRIEF DESCRIPTION OF THE DRAWINGS

The drawings are provided to illustrate various examples of the subject matter described herein related to a water impermeable polymer-fiber composite and are not intended to limit the scope of the subject matter. The drawings are not necessarily to scale.

DETAILED DESCRIPTION

Because of the environment the electronic device is in and the operational conditions the device is subjected to, it is desirable to have a housing that allows thermal management (e.g., dissipation of heat) while having desirable mechanical properties (e.g., low density, high elasticity, etc.). In view of the foregoing, following below ore detailed descriptions of various examples related to a polymer-fiber composite, particularly a liquid water impermeable composite. The various examples described herein may be implemented in any of numerous ways.

Provided in one aspect of the examples is a composite, comprising: a porous core layer comprising a fluoropolymer; a first layer disposed over at least a portion of the core layer, the first layer comprising fibers that comprise at least one of unidirectional fibers and woven fibers; and a second layer disposed over at least a portion of the first layer, the second layer comprising a polymer; wherein the composite is permeable to air but impermeable to liquid water.

Provided in another aspect of the examples is an electronic device, comprising: an electrical circuit; an housing exterior to the electrical circuit, the housing comprising a composite comprising: a porous core layer comprising a fluoropolymer; a first layer disposed over at least a portion of the core layer, the first layer comprising fibers that comprise at least one of unidirectional fibers and woven fibers; and a second layer disposed over at least a portion of the first layer, the second layer comprising a polymer.

Provided in another aspect of the examples is a method of making, comprising: disposing over at least a portion of a core layer a first layer, the core layer comprising a fluoropolymer and the first layer comprising fibers that comprise at least one of unidirectional fibers and woven fibers; disposing over at least a portion of the first layer a second layer, the second layer comprising a polymer; and thermal forming the core layer, the first layer, and the second layer into a composite; wherein the composite is a part of an housing of an electronic device and is permeable to air and impermeable to liquid water.

Figure 1:
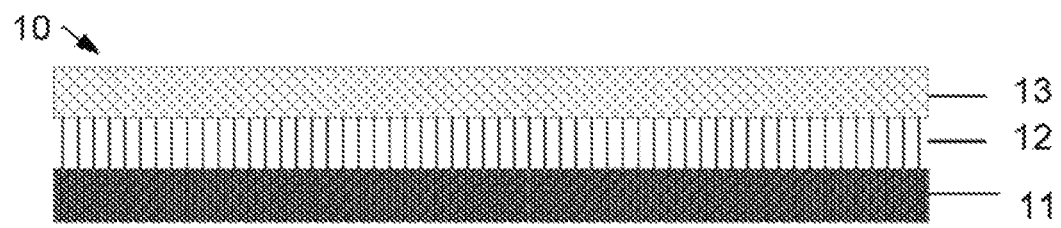
FIG. 1 shows, in one example, a schematic of a polymer-fiber composite described herein and the components thereof.

FIG. 1 provides a schematic of one example of a composite described herein in this disclosure (thereafter "herein" for short unless stated explicitly otherwise). The composite 10 comprises a porous core layer 11, a first fiber-containing layer 12, and a second exterior polymeric layer 13. It is noted that the terms "first," "second," "third," etc. herein are merely used to connote that the objects they respectively describe are different entities and are not meant to describe any chronological order, unless explicitly specified. The composite 10 is permeable to air but impermeable to liquid water.

Polymeric Core Layer

The porous core layer 11 of the composite 10 (as shown in, for example, FIG. 1) described herein may comprise any suitable material, depending on the application. The material may comprise, or be, a polymer. The polymer may be a fluoropolymer. A fluoropolymer may comprise at least one of polytetrafluoroethylene ("PTFE") and expanded polytetrafluoroethylene ("ePTFE"). In one example, the fluoropolymer comprises the fluoropolymer employed in the Gore-Tex® membrane.

The porous core layer may have any suitable level of porosity. For example, the porosity of the core layer described herein may be at least about 80%—e.g., at least about 85%, about 90%, about 95%, about 96%, about 97%, about 98%, about 99%, or higher. Depending on the context, the % in one example refers to vol %. Other porosity values are also possible. The porous core layer may have any suitable level of density. For example, the density of the core layer described herein may be less than or equal to about 0.5 g/cm$^3$—e.g., less than or equal to about 0.4 g/cm$^3$, about 0.3 g/cm$^3$, about 9.2 g/cm$^3$, about 0.1 g/cm$^3$, or lower. Other density values are also possible. The porous core layer may have any suitable thickness. For example; the thickness of the core layer described herein may be less than or equal to about 2 mm—e.g., less than or equal to about 1 mm, about 0.5 mm, about 0.4 mm, about 0.3 mm, about 0.2 mm, about 0.1 mm, or lower. Other thickness values are also possible.

The porous core layer herein may be permeable for gases, including air and water vapor, but impermeable to liquids. The porous core layer comprising the fluoropolymer may exhibit liquid impermeability (e.g., repellency) at, for example, a surface thereof, and possess a high contact angle with liquid water. The liquid repellency of the porous core layer described herein may be attributed to the size of the pores therein, which size allows passage of a gas but not liquid through the composite. Depending an the context, the term "size" of an object herein may refer to diameter, length, width, etc. thereof. For example, the porous core layer may comprise 1 billion to 15 billion micro-pores per square inch. For example, the pores in the core layer may have an average diameter of less than or equal to about 6 Å—e.g., less than or equal to about 5 Å, about 4 Å, about 4 Å, about 2 Å, about 1 Å, or smaller. In one example, the pores in the core layer have an average diameter of between about 2 Å and about 6 Å—e.g., between about 2.5 Å and about 5.5 Å, between about 3 Å and about 5 Å, between about 3.5 Å and about 4.5 Å, etc. In one example, the aforedescribed average pore size is about one ten-thousandth as large as a rain drop, yet is 700 times larger than a sweat drop or a vapor particle. Thus, in this example a liquid water drop may not pass the pores of the core layer, while vapor particles (e.g., perspiration, water vapor, etc.) may pass the pores.

The liquid impermeability of the porous core layer described herein may be reflected in the contact angle of the layer with a liquid droplet. For the example, the contact angle with liquid water may be at least about 90°—e.g., at least about 95°, about 100°, about 105°, about 110°, about 115°, about 120°, about 125°, about 130°, or higher. In one example, the contact angle with liquid water is 118°. The liquid impermeability and repellence, as evidenced in the aforedescribed contact angle, may make the core layer (and thus the composite) described herein unlikely to be wetted by general liquids and/or unlikely to adhere to other materials. The impermeability of the core layer with respect to a liquid (e.g. water) may be captured by, for example, less than or equal to about 20 vol % of a liquid (e.g., liquid wafer) being able to pass through the thickness of the core layer— e.g., less than or equal to about 15 vol %, about 10 vol %, about 5 vol %, about 1 vol %, or lower.

The air/gas permeability of the porous core layer described herein may be reflected in the Frazier number of the layer. For example, the Frazier number of the layer may be between about 0.1 and about 500—e.g., between about 0.2 and about 450, between about 0.5 and about 400, between about 0.8 and about 350, between about 1 and about 300, between about 5 and about 250, between about 10 and about 200, between about 20 and about 150, between about 40 and about 100, between about 60 and about 80, etc. Other Frazier number values are also possible. In one example, the Frazier number of the core layer described herein is greater than about 70, such as between about 100 and about 300— e.g., between about 150 and about 250, etc. In another example, the Frazier number of the core layer described herein is less than about 20, such as between about 0.5 and about 15—e.g., between about 0.6 and about 10, between about 0.8 and about 8, between about 0.9 and about 5, between about 1 and about 4, etc.

The fluoropolymer in the porous core layer described herein may be in the form of a plurality of microfibers. In one example, the internal network structure formed with the microfibers of the PTFE porous film is heat resistant and surface lubricative, and accordingly allows the dust absorbed at its surface to be easily removed. The porous core layer describes herein may be laminated with other materials.

Fiber-Containing Layer

The fibers in the fiber-containing layer 12 of the composite 10 (as shown in, for example, FIG. 1) described herein may comprise any suitable material, depending on the application. It is noted that while the fiber-containing layer 12 is disposed on the top side of the core layer 11 in FIG. 1, the fiber-containing layer 12 may be disposed on the bottom side, or both the top and bottom sides. The material of the fibers may comprise a ceramic, a pure metal, a metal alloy, a compound, a polymer, etc. The fibers may comprise an inorganic material, an organic material, or both. The fibers may comprise a natural material, a synthetic material, or both. For example, the fibers may comprise carbon nanotubes. For example, the fibers may comprise at least one of carbon fibers, glass fibers, aramid fibers, and titanium fibers.

The fibers may comprise carbon fibers. The carbon fibers may be any type of fiber containing carbon atoms. The carbon fibers may comprise natural carbon fibers, synthetic carbon fibers, or both. For example, the carbon fibers may comprise at least one of polyacrylonitrile ("PAN"), rayon, pitch, and aramid carbon fibers. The carbon fibers may be commercially available carbon fibers. In one example, the carbon fibers comprise TORAYCA® T700S/T300 (from Toray Industries, Inc., Japan). In another example, the carbon fibers comprise Mitsubishi Rayon: PYROFIL® P330 series (from Mitsubishi Rayon Co., Ltd., Japan). In another example, the carbon fibers comprise at least one of Tenax®-J HTS40 E13 3K 200tex, HTS40 E13 6K400tex, and HTS40 E13 12K 800tex (from Toho Tenax America, Inc., TN, US). In another example, the carbon fibers comprise at least one of Tanax®-E HTS40 E13 12K 800tex and HTS40 F13 24K 1600tex (from Toho Tenax America, Inc., TN, US).

The fibers may comprise glass fibers. The glass fibers may comprise a ceramic, such as an oxide, such as a metal oxide, a silicate, a nitride, etc. In one example, the glass fibers comprise silica. In another example, the glass fibers comprise alumino-borosilicate glass with less than 1% w/w alkali oxides. In another example, the glass fibers comprise alkali-lime glass with little or no boron oxide). In another example, the glass fibers comprise, alumino-lime silicate with less than 1% w/w alkali oxides). In another example, the glass fibers comprise alkali-lime glass with high boron oxide content. In another example, the glass fibers comprise borosilicate glass. In another example, the glass fibers comprise alumino silicate glass without MgO and CaO. In another example, the glass fibers comprise alumino silicate glass without CaO but with high MgO content with high tensile strength). Other types of glasses are also possible.

The fibers may comprise polymeric fibers, such as synthetic fibers. In one example, the fibers comprises polyamide, such as aramid fibers. An aramid fiber herein may refer to a fiber made as a result of a reaction between an amine-containing material and a carboxylic acid halide containing material. Aramid fibers herein may include para-aramid fibers, such as Kevlar®, Twaron®, etc.

The fibers may comprise metal fibers. The metal may be in the form of a pure metal, a metal alloy, or both. The metal may comprise a noble metal, a transition metal, or both. In one example, the metal composes titanium. Other types of metals or metal alloys are also possible.

The fibers may compose continuous fibers. The fibers may comprise discontinuous fibers. The fibers may have any suitable dimensions. In one example, the fibers have an average diameter of between about 5 μm and about 10 μm. Diameters of a larger or a smaller value are also possible. In one example, the fibers in a fiber-containing layer are continuous fibers and have the same length as the length of the fiber-containing layer and/or the composite. Shorter or longer fibers are also possible.

The fibers described herein in this disclosure may be embedded within (e.g., pre-impregnated by) a polymeric matrix. The polymeric matrix may comprise any suitable polymer, such as a polymer resin. In one example, the polymeric matrix comprises a thermoplastic. In another example, the polymeric matrix comprise a thermoset. In one example, a thermoplastic herein includes at least one of PG-ABS, nylon, polyethylene ("PE"), and polypropylene ("PP"). In one example, a thermoset herein includes at least one of an epoxy resin and a polyimide. The polymer in the polymeric matrix may be the same as or different from that of the polymeric core layer. For example, the polymer in the polymeric matrix may comprise at least one of poly(methyl methacrylate) ("PMMA"), polycarbonate ("PC"), acrylonitrile butadiene styrene ("ABS"), poly (p-phenylene sulfide) ("PPS"), polyether ether ketone ("PEEK"), polyethersulfone ("PES"), and polyamide. In one example, the fiber-containing layer comprises Tepex® from Bond-Laminates GmbH, USA. In another example, the fiber-containing layer comprises TenCate CFRT® from TenCate Performance Composites, USA.

The fibers in a layer containing both fibers and a polymeric matrix may be present at any suitable content value. For example, the fibers may be between about 10 wt % and about 80 wt % (balanced by the matrix) in a fiber-containing layer—e.g., between about 20 wt % and about 70 wt %, between about 30 wt % and about 60 wt %, between about 40 wt % and about 50 wt %, etc. Other content values are also possible.

The fibers in the fiber-containing layer may be arranged in any orientation (or direction). The fibers may be any of the fibers described herein. For example, the fibers may be aligned in one preferred direction. As a result, the fiber-containing layer having the aligned fibers may exhibit anisotropic material properties. This direction may be any suitable direction, depending on the application. For example, this direction may be parallel to the larger dimension in a plane as defined by the length and width of the composite, or it may be perpendicular to this dimension. In the case where all of the dimensions in this plane are the same, or comparable, this direction may be any predetermined, pre-designated direction. For example, the anisotropic fiber-containing layer may exhibit stronger mechanical properties (e.g., elastic modulus, flexural modulus, etc.) along the preferred, aligned direction than the one orthogonal thereto. A layer containing fibers aligned in one (preferred) direction may refer to a layer having at least about 80 vol % of the fibers aligned in that direction—e.g., at least about 85 vol %, about 90 vol %, about 95 vol %, about 99 vol %, about 99.5 vol %, about 99.9 vol %, or higher. Other vol % values are also possible. In one example, the fibers exhibiting a preferred direction herein are referred to as "unidirectional fibers."

The fibers may also be woven fibers. The fibers may be any of the fibers described herein. The woven fibers may be in at least one of the following forms; plain, twill, satin, triaxial, stitched, basket, continuous strand mat, and veil. For example, unidirectional fibers may be fed into a weaving machine to make woven fibers. In one example, a woven-fiber-containing layer exhibits isotropic material properties, at least with respect to the plane as defined by the woven fibers. In other words, the isotropic fiber-containing layer may exhibit the same, or about the same, mechanical properties in all directions of the layer (in the plane).

Exterior Polymeric Layer

The exterior polymeric layer 13 of the composite described herein may comprise any suitable material. It is noted that while the layer 13 is termed "exterior" and is the outermost layer of the composite shown in FIG. 1, this exterior polymeric layer need not be the uttermost layer. The term "exterior" herein is merely used to describe the relative position of this layer with respect to the porous core layer and the first fiber-containing layer. In one example, there are additional materials or layers disposed over the exterior polymeric layer. The polymer in the exterior polymeric layer 13 may comprise synthetic polymer, natural polymer, or both. In one example, the exterior polymeric layer 13 comprises polymeric fabrics. The material may comprise, for example, a thermoset, a thermoplastic, or both. For example, the material may comprise a polyamide, polyester, or both. In one example, the exterior polymeric layer comprises water-proof textile fabrics.

The polyamide may have a weight-average molecular weight ranging from about 70,000 to about 300,000. The polyamide may comprise, or be, a nylon-nylon or PA 11 ("PA-11"), nylon or PA 12 ("PA-12"), nylon or PA 6 ("PA-6"), nylon or PA 8 ("PA-8"), nylon or PA 9 ("PA-9"), nylon or PA 66 ("PA-66"), nylon or PA 612 ("PA-612"), nylon or PA 812 ("PA-812"), nylon or PA 912 ("PA-912"), etc. The nylon may be a high molecular weight nylon—e.g., polyamide 12, polyamide 6, polyamide 8, polyamide 11, polyamide 66, and combinations thereof. Other poly-amides are also possible.

A polyester herein may refer to any material that comprise an ester functional group in the main chain. The polyester may be a thermoset or a thermoplastic. The polyester may comprise a liquid crystalline polyester. The polyester may be aliphatic, semi-aromatic, or aromatic. In one example, the polyester comprises polyglycolide or polyglycolic acid ("PGA"), polylactic acid ("PLA"), polycaprolactone ("PCL"), polyhydroxyalkanoate ("PHA"), polyhydroxybutyrate ("PHB"), polyethylene adipate ("PEA"), polybutylene succinate ("PBS"), poly(3-hydroxybutyrate-co-3-hydroxyvalerate)("PHBV"), polyethylene terephthalate ("PET"), polybutylene terephthalate ("PBT"), polytrimethylene terephthalate ("PTT"), polyethylene naphthalate (PEN), etc.

The exterior polymeric layer 13 may be permeable to a gas but impermeable to a liquid. The liquid may be liquid water. In one example, the exterior polymeric layer 13 has the same liquid impermeability and air permeability properties as the core layer. These properties include the water contact angle, the average pore size, etc., as described above. In one example, the average pore size in this exterior polymeric layer 13 is greater than 3 Å but less than the size of a water droplet—e.g., in the micrometer range, such as between about 1 μm and about 500 μm, such as between about 10 μm and about 200 μm, between about 50 μm and about 100 μm, etc.

Polymer-Fiber Composite

The aforedescribed core layer, fiber-containing layer, and the exterior polymeric layer may be assembled in any combination to form a polymer-fiber composite.

Figure 2:
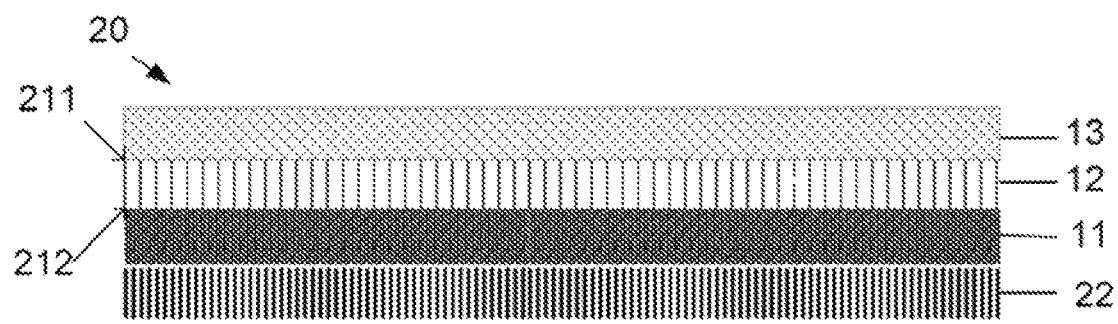
FIG. 2 shows, in another example, a schematic of a polymer-fiber composite described herein and the components thereof.

The composite may further comprise at least one additional surface-containing layer and at least one additional exterior polymeric layer. As shown in the composite 20 in FIG. 2, in addition to the fiber-containing layer 12 and exterior polymeric layer 13 deposed over the first side 211 of the core layer 11, a second fiber-containing layer 22 is disposed over the second side 212 of the core layer 11. Moreover, an additional exterior polymeric layer may be disposed over the fiber-containing layer 22 over the second side to mirror the different layers on the first side 211 (not shown).

Each of the layers of the composite described herein may have any suitable thickness. In one example, these layers have the same thickness. In another example, these layers have different thickness. For example, the core layer may be thicker than the fiber-containing layer and the exterior polymeric layer. The core layer may also be thinner than the fiber-containing layer and the exterior polymeric layer. For example, the fiber-containing layer may be thicker than the core layer and the exterior polymeric layer. The fiber-containing layer may also be thinner than the core layer and the exterior polymeric layer. For example, the exterior polymeric layer may be thicker than the core layer and the fiber-containing layer. The exterior polymeric layer may be thinner than the core layer and the fiber-containing layer.

The overall polymer-fiber composite described herein may have any suitable thickness, depending on the application. For example, the composite may have a thickness in the millimeter range. In one example, the polymer-fiber composite described herein has a thickness of less than or equal to about 2.5 mm—e.g., less than or equal to about 2.0 mm, 1.5 mm, about 1.2 mm, about 1.0 mm, about 0.8 mm, about 0.8 mm, or smaller. In another example, the thickness of the polymer-fiber composite is greater than or equal to about 2.5 mm. Within the composite, each layer may have any suitable thickness. In one example, the core layer has a thickness of that is twice as much as each of the fiber-containing layers. In one example, the core layer has a thickness of about 0.2 mm, whereas each of the fiber-containing layers has a thickness of about 0.1 mm. In one example, the composite has a thickness between about 0.4 mm and about 2.0 mm—e.g., between about 0.8 and about 1.6 mm, between about 0.8 mm and about 1.2 mm, etc. In one example, the fluoropolymer-containing core layer has a thickness between about 0.001 mm and about 0.5 mm—e.g., between about 0.005 mm and about 0.1 mm, between about 0.01 mm and about 0.05 mm, etc. In one example, the other (fiber-containing) layer(s) in the composite has a thickness between about 0.05 mm and about 0.4 mm—e.g., between about 0.1 mm and about 0.2 mm, etc. Other thickness values for composite, the core layer, and the fiber-containing layers are possible.

Any of the fiber-containing layers described herein may comprise fibers embedded within a polymeric matrix, as described above. The polymeric matrix may comprise any suitable material, such as those described herein. For example, the fibers in a first fiber-containing layer may be embedded in a first polymeric matrix; and the fibers in a second fiber-containing layer may be embedded m a second polymeric matrix. In one example, the different fiber-containing layers comprise different polymeric materials as the matrix material from one another—in this instance, the first polymeric matrix and the second polymeric matrix compose different polymeric materials. In another example, the different fiber-containing layers compose the same polymeric materials as the matrix material. In another example where more than two fiber-containing layers are present, some of the fiber-containing layers comprise the same polymeric materials as the matrix as some others, while the otters comprise different polymeric materials.

Depending on the materials involved and the arrangement thereof, the polymer-fiber composite described herein may have any suitable mechanical properties. For example, the composite described herein may have a high flexural strength in comparison to a metal or a metal alloy of comparable, or the same, size. The flexural strength of a material herein may be reflected in the flexural modulus (also often known as "bending modulus") of the material. The flexural modulus of a material may be obtained by ASTM D730 using a 3-point bending test on the material in the form of a rectangular beam and may be expressed by $$E_{flex}=L^3F/(4wh^3d):$$

where $E_{flex}$ is flexural modulus, w and h the width and thickness of the beam, L the distance between the two outer supports, and d the deflection due to the load F applied at the middle of the beam.

In one example, a composite comprising a core layer, a first fiber-containing layer, and a second exterior polymeric layer (as shown in FIG. 18) has a flexural modulus of at least about 5 GPa—e.g., at least about 10 GPa, about 20 GPa, about 30 GPa, about 40 GPa, about 50 GPa, about 60 GPa, about 70 GPa, about 80 GPa, or higher. In one example, the fibers in the first fiber-containing layer are woven fibers. Depending on the materials and geometry involved, higher or lower flexural modulus values are also possible.

The polymer-fiber composite described herein may have several additional desirable properties. In one example, due at least in part to the fluoropolymer-containing core layer, the composite described herein is permeable to air. In another example, due at least in part to the fluoropolymer-containing core layer, the composite described herein is impermeable to liquid water. In one example, due at least in part to the fluoropolymer-containing core layer, the composite described herein is impermeable to liquid water and permeable to air.

Additionally, while the polymer-fiber composite described herein may provide the same, or comparable, mechanical properties (e.g., flexural modulus) as a metal-containing composite, the polymer-fiber composite described herein may be lighter than the metal-containing composite, and at the same time providing (hot) air ventilation out of the interior of the composite. For example, the polymer-fiber composite described herein may have a density that is between about 1.0 g/cm$^3$ and about 2.0 g/cm$^3$—e.g., between about 1.1 g/cm$^3$ and about 1.5 g/cm$^3$ between about 1.2 g/cm$^3$ and about 1.4 g/cm$^3$, etc. Other values are also possible. In one example, the density is between about 1.2 g/cm$^3$ and about 1.3 g/cm$^3$.

Methods of Making

Figure 3:
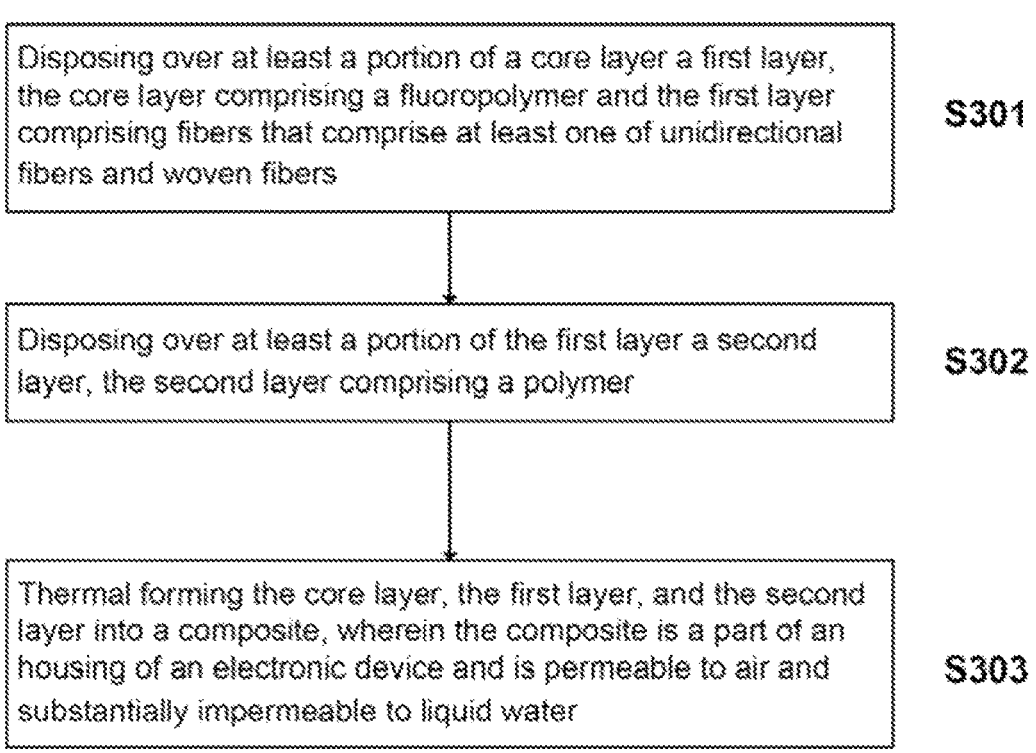
FIG. 3 provides a flowchart showing, in one example, the processes involved in making a polymer-fiber composite described herein.

The polymer-fiber composite described herein may be fabricated by a method involving any suitable process(es). FIG. 3 provides a flowchart showing the processes involved in one example of a method of making a composite described herein. As shown in FIG. 3, the method in this example comprises disposing over at least a portion of a core layer a first layer, the core layer comprising a fluoropolymer and the first layer comprising fibers that comprise at least one of unidirectional fibers and woven fibers (S301). Subsequently, the method comprise disposing over at least a portion of the first layer a second layer, the second layer comprising a polymer (S302). Thereafter, the method comprises thermal forming the core layer, the first layer, and the second layer into a composite (S303). The core layer, the first fiber-containing layer, and the second exterior polymeric layer may be any of those described herein. The composite described in this example is a part of a housing of an electronic device and is permeable to air and impermeable to liquid water.

The conditions involved the different processes during the fabrication described herein may vary depending on the materials involved. For example, thermal forming may involve a process in which a plastic sheet is heated to a pliable forming temperature, formed to a specific shape in a mold, and trimmed to create a usable product. The sheet may be heated in an oven to a temperature high enough to permit it to be stretched into or onto a mold and cooled to a finished shape. The sheet may be pressed at the elevated temperature by a mechanical pressure.

The temperature to be elevated to may depend on the materials involved. For example, when the core layer comprises PC, the elevated (hot pressing) temperature may be at least about 150° C.—e.g., at least about 160° C., about 170° C., about 180° C., about 190° C., about 200° C., about 220° C., about 240° C., about 260° C., about 280° C., about 300° C., or higher. Other temperatures are also possible. In one example, the hot pressing temperature involved during thermal forming is between about 160° C. and about 260° C. In another example, the hot pressing temperature involved during thermal forming is between about 180° C. and about 220° C.

The thermal forming process may involve any suitable mechanical pressure (for the pressing), depending on the application. The pressure per part may be between about 1 kgf and about 5000 kgf—e.g., between about 10 kgf and about 1000 kgf, between about 50 kgf and about 500 kgf, between about 100 kgf and about 200 kgf. Other pressure values are also possible.

In one example, a plastic sheet is fed from a roll or from an extruder info a set of indexing chains that incorporate pins, or spikes, that pierce the sheet and transport it through an oven for heating to forming temperature. The heated sheet then indexes into a form station where a mating mold and pressure-box close on the sheet, with vacuum then applied to remove trapped air and to pull the material into or onto the mold along with pressurized air to form the plastic to the detailed shape of the mold. Plug-assists may be employed in addition to vacuum in the case of taller, deeper-draw formed parts in order to provide the needed material distribution and thicknesses in the finished parts. In one example, after a short form cycle, a burst of reverse air pressure is actuated from the vacuum side of the mold as the form tooling opens (also known as air-eject) to break the vacuum and assist the formed parts off of, or out of, the mold. A stripper plate may also be utilized on the mold as it opens for ejection of more detailed parts or those with negative-draft, undercut areas. In this example, the sheet containing the formed parts then indexes into a trim station on the same machine, where a die cuts the parts from the remaining sheet web, or indexes into a separate trim press where the formed parts are trimmed. The sheet web remaining after the formed parts are trimmed may be wound onto a take-up reel or fed into an inline granulator for recycling. Additional or different processes from those described herein during thermal forming may be employed.

Additional processes may be employed in the fabrication method described herein. For example, the method may involve preparing and/or forming at least one of the core layer, the first layer, and the second layer. The preparation of the fiber-containing layers may involve cutting the commercially available fiber-containing layers and the core layer into the desired dimensions.

The method may further comprise impregnating the fibers in a thermoplastic polymeric matrix in the layers before the method of making the composite as described in FIG. 3 begins—i.e., "pre-impregnating" the fibers in the matrix. The impregnation of the fibers into the polymeric matrix may involve any suitable technique. For example, the technique may comprise a batch process, such as hot pressing, such as one using multilayer lamination. The technique may also involve a continuous process, such as one using a flatbed-laminator system (e.g., MEYER® Flatbed-Laminator-Systems, from Herbert Meyer GmbH, Germany). The fibers may be any of those described herein, and the thermoplastic polymeric matrix may comprise any of the polymers described herein. The method may further comprise integrating the composites as fabricated into another structural component such as the housing of a device. The device may be an electronic device.

Applications

Figure 4:
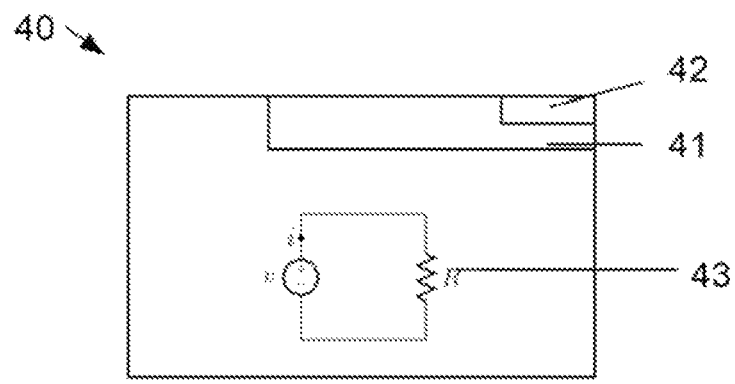
FIG. 4 shows, in one example, a schematic of an electronic device comprising a housing comprising a polymer-fiber composite described herein.

Due at least in part to the numerous aforedescribed desirable properties, the polymer-fiber composite described herein may be employed in various applications. For example, the composite may be an integral part of a structural component. The component may be a part of the housing of an electronic device. A housing of a device may refer to any structural component that encloses the interior of the device. In one example, the composite described herein is a part of the housing of an electronic device. For example, the composite may be any part of the housing, including back cover, front cover, side cover, and the like, of the device. FIG. 4 shows, in one example, a schematic of an electronic device 40 comprised a housing 41 comprising a polymer-fiber composite 42, including any of the composites described herein. The housing (or a part thereof) 41 is external to the electrical circuit 43 in the interior of the device 40. The electrical circuit 43 may be any type of electrical circuit having any suitable configuration and component. It is noted that while FIG. 4 shows that the composite is in a portion of the top cover, the composite may constitute the entire cover on one side, or multiple sides, as a part of the housing of the device.

An electronic device herein may refer to any device comprising at least one electrical circuit. Thus, in one example, the housing that comprises the composite described herein may be external to the electrical circuit. The electronic device may be a consumer electronic device. An electronic device may refer to portable/mobile electronic device. An electronic device here may refer to a computer, a memory storage, a display, a signal transmitting device, and the like. A computer may refer to a desktop, a laptop, a tablet, a phablet, a tablone, and the like. A storage unit may refer to the hardware of a hard drive, a server, a processor, and the like. A display may refer to a monitor, a liquid crystal display ("LCD"), a television, and the like. A signal transmitting device may refer to a device transmitting any type of signal including light, sound, heat, and the like. In one example, the electronic device is a mobile phone.

Not to be bound by any particular theory, but the configuration of the composite described herein may provide the device in which the composite is employed with desirable properties. For example, the composite (or the portion of an electronic device comprising the composite) may allow dissipation of heat (via air flow) from inside the device while being impermeable to liquid (from entering the interior of the device). An electronic device including the composite described herein in the housing thereof may have an internal air temperature of lower than or equal to about 60° C.—e.g., lower than equal to about 50° C., about 40° C., about 30° C., etc. Additionally, the fibers provide reinforcement in the composite, thereby providing the composite as a whole with improved mechanical properties (in comparison to a composite with the fibers).

Additional Notes

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Concentrations, amounts, and other numerical data may be expressed or presented herein in a range format. Such a range formal is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values or 1 wt % to 5 wt %, but also include individual values and sub-ranges within the indicated range. Thus, included in this numerical range are individual values, such as 2, 3, 5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

The phrase "and/or," as used herein in this disclosure, including the claims, should be understood to mean "either or both" of the elements so conjoined. i.e., elements that are conjunctively present in some cases and disjunctively present in other cases. Multiple elements listed with "and/or" should be construed in the same fashion, i.e. "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one example, to A only (optionally including elements other than B); in another example, to B only (optionally including elements other than A); in yet another example, to both A and B (optionally including other elements); etc.

As used in this disclosure, including the claims, "or" should be understood to have the same meaning as "and/or" as defined above. For example, when separating items in a list, "or" or "and/or" shall be interpreted as being inclusive, i.e. the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in this disclosure, including the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

What is claimed:

1. A composite, comprising:
a porous core layer comprising a fluoropolymer;
a first layer disposed over at least a portion of the core layer, the first layer comprising fibers that comprise at least one of unidirectional fibers and woven fibers; and
a second layer disposed over at least a portion of the first layer, the second layer comprising a polymer, and the second layer being permeable to gas;
wherein the composite is permeable to air but impermeable to liquid water.

2. The composite of claim 1, wherein the fluoropolymer comprises at least one of polytetrafluoroethylene ("PTFE") and expanded polytetrafluoroethylene ("ePTFE).

3. The composite of claim 1, wherein the core layer has an average pore size of less than or equal to about 3 Å.

4. The composite of claim 1, wherein the fibers comprise at least one of carbon fibers, glass fibers, aramid fibers, and titanium fibers.

5. The composite of claim 1, wherein the fibers are embedded in a polymeric matrix in the first layer, the polymeric matrix comprising at least one of a thermoplastic and a thermoset.

6. The composite of claim 1, wherein the fibers comprise woven fibers.

7. The composite of claim 1, wherein the polymer in the second layer comprises at least one of nylon and polyester.

8. The composite of claim 1, wherein the polymer in the second layer has an average pore size of between about 1 μm and about 500 μm.

9. The composite of claim 1, wherein the composite has a flexural modulus of at least 10 GPa.

10. The composite of claim 1, wherein the porous core layer has a thickness less than or equal to about 2 mm.

11. The composite of claim 1, wherein the porous core layer is laminated with the first layer and the second layer.

12. An electronic device, comprising
an electrical circuit;
a housing exterior to the electrical circuit, the housing comprising a composite comprising:
a porous core layer comprising a fluoropolymer;

a first layer disposed over at least a portion of the core layer, the first layer comprising fibers that comprise at least one of unidirectional fibers and woven fibers; and a second layer disposed over at least a portion of the first layer, the second layer comprising a polymer, and the second layer being permeable to gas.

13. The electronic device of claim 12, wherein the composite is permeable to air.

14. The electronic device of claim 12, wherein composite is impermeable to liquid water.

15. The electronic device of claim 12, wherein the composite constitutes an entire side or multiple sides of the housing of the electronic device.

\* \* \* \* \*